United States Patent Office 3,441,946
Patented Apr. 29, 1969

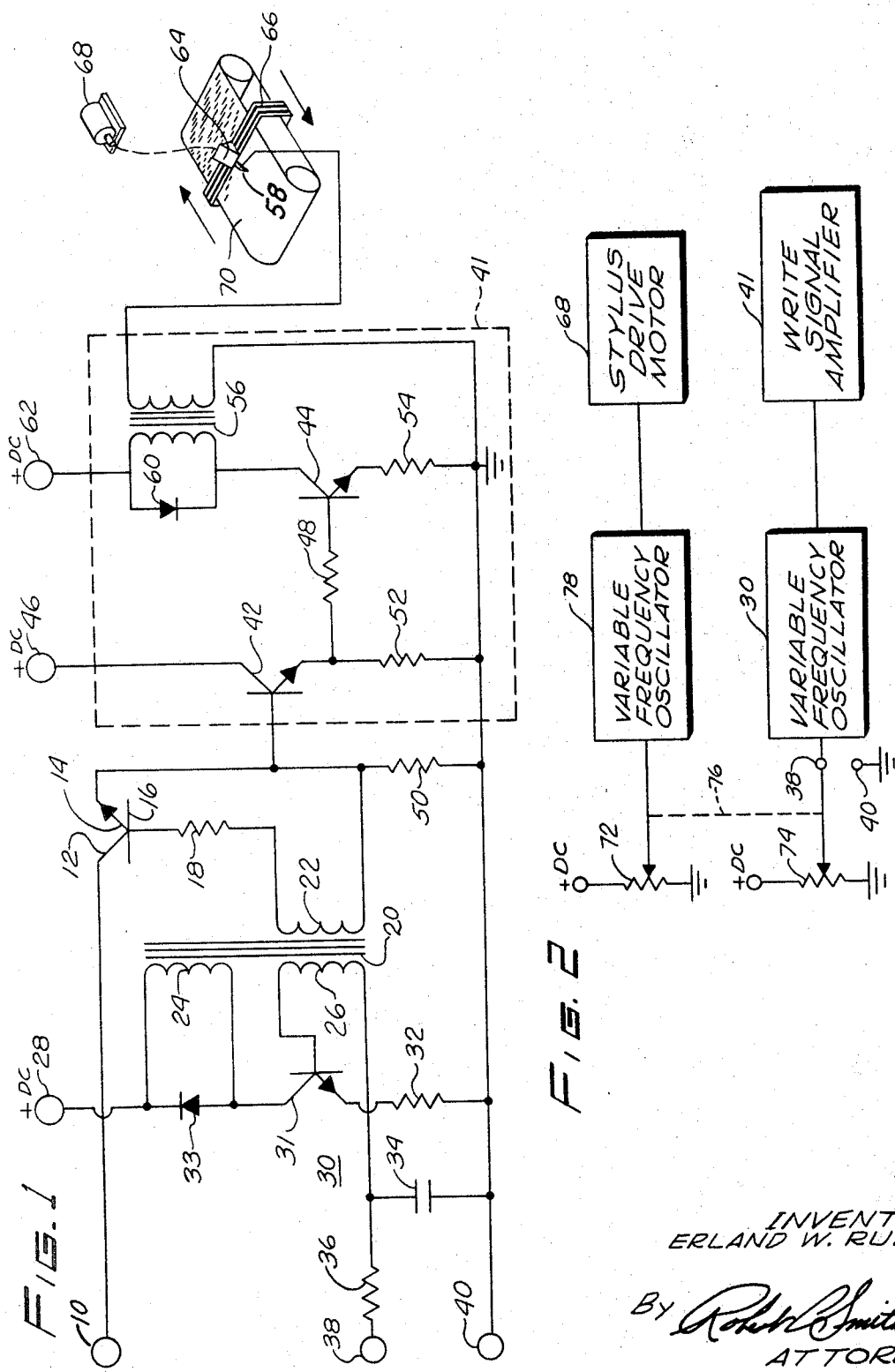

3,441,946
CIRCUIT FOR SUPPLYING WRITING SIGNALS FOR USE WITH ELECTROSENSITIVE PAPER RECORDERS
Erland W. Rudy, Granada Hills, Calif., assignor to The Bendix Corporation, North Hollywood, Calif., a corporation of Delaware
Filed June 29, 1965, Ser. No. 468,043
Int. Cl. G01d 15/06
U.S. Cl. 346—74        4 Claims

ABSTRACT OF THE DISCLOSURE

An electrical "write" circuit for controlling the amount of instantaneous power supplied to the writing stylus of a recording device using electrosensitive recording paper. Input pulses are supplied from a source which may vary greatly in voltage amplitude. These pulses are connected to the stylus through a switching circuit including a transistor which is enabled to conduct by a frequency-sensitive device including an oscillator-controlled pulse transformer. Thus the input pulses are converted to a series of short pulses whose total power level is insufficient to excessively blacken the recording paper. These pulses are amplified and then coupled to the stylus through a transformer. The stylus drive speed is coordinated with the frequency of the writing pulses. The oscillator output is variable to alter the pulse frequency with changing conditions such as a changed scale with slower or faster movement of the recording paper.

---

This invention relates to recording instruments and more particularly to a circuit for supplying electrical output signals to a recording medium such as electrosensitive paper.

A very common form of electrical recording device includes a pair of rollers upon which a chart of electrosensitive recording paper is carried and a track structure suspended across the paper upon which is mounted a stylus carriage movable transversely to the direction of movement of the paper. With this arrangement, the stylus may be moved to almost any position on the paper since the speed and direction of movement of the stylus on its track are controllable, as well as the speed and direction of movement of the chart. By supplying an electrical signal responsive to a first variable condition to the belt-driving rollers and another electrical signal responsive to a second variable condition to the stylus carriage positioning mechanism, the stylus will be caused to plot the characteristic of the first variable condition versus the second variable condition.

Some of the more recent types of recording devices operate in conjunction with digital computing devices, in which case they are adapted to receive pulse inputs rather than variable D.C. voltages. As an example, the rollers carrying the paper chart may be moved by means of a step motor which rotates a given amount and advances the paper chart a given amount for each pulse. At the same time, the stylus carriage may be so driven, by a step motor or otherwise, that the stylus travels along a single line across the paper for each position of the paper chart. The position of a mark along the line is controlled by means of an electrical circuit which emits a paper-darkening pulse at the proper instant. The series of pulses resulting as the stylus traces across succeeding lines becomes a graph plotting the desired characteristics.

The electrosensitive papers used vary somewhat in their effective resistance, and therefore the amount of voltage or power required to make an acceptably dark mark also varies. In designing such recorders it is required that the pulse constituting the writing signal be of sufficient voltage that it is certain to mark the paper. The output pulse from the control circuit which supplies this voltage normally is of appreciable duration with the result that a substantial amount of power is consumed for each pulse. The marking of the paper occurs almost instantaneously, however, and any further flow of current represents wasted power. A pulse of power lasting only a few microseconds or less will mark the paper just as effectively as power applied for a longer interval. This excess of power results in decreased stylus life because of power dissipation at the tip, besides requiring that the output stage of the driving amplifier be larger and heavier than necessary.

Some useful intelligence can be conveyed by controlling the darkness of the marks made in proportion to the voltage level of the input pulses. In order to preserve this advantage, it is necessary to be able to avoid great changes in darkening of the paper with changes in stylus speed. Many recorders include range-switching means or other arrangements which necessarily cause the speed of the stylus to be varied with the selection of different input signals, etc. If the frequency with which the write pulses arrive at the stylus is not changed correspondingly, slower stylus speeds will necessarily result in darker marking and faster stylus speeds will result in lighter marking. It is, therefore, an object of the present invention to provide a writing circuit for a pulse-type recording device in which current pulses supplied to the stylus are of sufficient voltage to mark the electrosensitive paper, but of such short duration that the total power dissipated per pulse is not greatly in excess of the required to mark the paper.

It is another object of the present invention to provide a writing circuit for a pulse-type recording device in which the amplifier stage for the stylus write signal is reduced in size, cost and weight as compared with similar prior art devices.

It is a further object of the present invention to provide a writing circuit for a pulse-type recording device in which the service life of the stylus is greatly extended.

It is a further object of the present invention to provide a write signal controlling system for a pulse-type recording device in which the write signals are capable of providing improved intelligence through varying the range of darkness of the marks on the chart.

It is a still further object of the present invention to provide a write signal controlling system for a pulse-type recording device in which the above objectives are accomplished despite changes in speed of the stylus.

Other objects and advantages will become apparent from the following specification and the accompanying drawings, in which:

FIGURE 1 is a schematic diagram of a writing circuit incorporating my invention; and FIGURE 2 is a block diagram incorporating the system of FIGURE 1 including means for coordinating the frequency of the write signal with the speed of the stylus.

Referring now to the drawing, a pulse input signal is supplied to an input terminal 10 connected to the collector 12 of a transistor 14. The base 16 of this transistor is connected through a resistor 18 to the secondary winding 22 of a pulse transformer 20. The pulse transformer 20 has two other windings 24 and 26 which are connected between a source of direct current supplied to a terminal 28 and ground and which form part of a blocking oscillator 30. This oscillator includes a transistor 31 connected to terminal 28 through winding 24 and also connected to a biasing resistor 32 which is connected at its opposite end to ground. A diode 33 connected in parallel with winding 24 serves to protect transistor 31 from voltage surges. An R-C circuit consisting of a capacitor 34 and a resistor 36 is connected to winding 26 and to a pair of input terminals 38 and 40. The output frequency of the oscillator 30 may be varied by changing the input voltage applied to terminals 38 and 40, the capacitance of capacitor 34 or the resistance of resistor 36. Pulse transformer 20 is designed to provide pulses of a desired length, such as seven microseconds, at the frequency established by the oscillator circuit. These pulses, which are applied to the base 16 of transistor 14, act to turn transistor 14 on to permit the write signal applied to terminal 10 to pass through transistor 14 to a write signal amplifier 41 incorporating additional cascaded amplification stages including transistors 42 and 44. The collector of transistor 42 is connected to a direct current source at a terminal 46, and its emitter is connected through a coupling resistor 48 to the base of transistor 44. Resistors 50 and 52 are bias resistors for the base and emitter of transistor 42, and resistor 54 is an emitter bias resistor for transistor 44. Write signals appearing at the collector of transistor 44 are coupled through an output transformer 56 to a stylus 58. During the interval between pulses from the transformer 20, transistor 14 is cut off, and the write signal is prevented from passing through to the stylus. A diode 60 is connected in parallel with the primary winding of output transformer 56 between transistor 44 and its source of collector voltage at a terminal 62 for the purpose of protecting transistor 44 from voltage surges which might cause it to be damaged at the time the stylus current is shut off.

The stylus 58 is mounted on a carriage 64 which is moved across a track 66 by means of a motor 68 which may be a step motor. This carries the stylus along a single line, and it may make one or more marks along this line on the paper chart 70, depending upon the pulses supplied to it. The location of these marks along the line is determined by control circuit means outside the scope of the present invention. When the stylus 58 has completed its travel across the line, the paper chart 70 is advanced by an interval which may be .015 to .030 inch, and the stylus moves across the paper again. In this manner the stylus traces a characteristic pattern on the paper chart.

When an input pulse appears at terminal 10 it is blocked by the transistor 14 until the blocking oscillator 30 supplies a pulse to the base 16 of said transistor. This pulse then effectively switches said transistor on for an interval, such as seven microseconds, determined to be sufficient to assure marking, after which the pulse ceases and transistor 14 is again turned off. The seven-microsecond write signal from transistor 14 is then amplified by means of transistors 42 and 44 and is coupled to the stylus 58 by means of output transformer 56. Each time a pulse is received at the stylus, a mark is made on the paper chart. The write pulses, of which there may be many for each input pulse appearing at terminal 10, are limited as to length or duration but may carry intelligence in the form of varying amplitudes. The higher voltage pulses carry more energy and will darken the electroresponsive paper to a greater extent than lower voltage pulses. Thus the varying intensity of darkness of the pattern may be used to convey information.

It is often desirable, in recording devices of the type described, to have a number of ranges or regimes of operation available. To accomplish this usually requires making substantial changes in the speed at which the stylus moves across the paper chart. At the same time, the frequency of the write pulses must be varied in the same direction if there is not to be a large change in the effective darkness of the trace. FIGURE 2 is a schematic diagram of a system for use with the writing circuit of FIGURE 1, which provides means for changing the speed of the stylus drive motor 68 and at the same time varies the output frequency of the blocking oscillator 30. A pair of potentiometers 72 and 74 are ganged together by means of a mechanical connection 76, and each is connected to a source of direct current voltage. Potentiometer 74 is connected to terminals 38 and 40 (FIGURE 1) and provides a variable direct current voltage to the blocking oscillator 30 which causes its output frequency to vary. This, of course, changes the frequency at which transistor 14 is turned on and off, and thereby varies the frequency of the write pulses supplied to the stylus 58. Potentiometer 72 supplies a variable direct current to a variable frequency oscillator 78 which might be any of several well known types or like oscillator 30. If a pulse output is desired, such an oscillator may operate to switch a transistor in the same manner as transistor 14 is switched. The variable frequency pulse output may be used to supply the stylus drive motor 68 if the motor were a step motor. In such case the speed of the stylus motor would be directly proportional to the frequency of the pulse input. The stylus drive motor might also be a synchronous motor, in which case an oscillator having a conventional sine wave output would be required.

With the arrangement as described, any adjustment of potentiometer 72 which operates to vary the output frequency of oscillator 78 will also be transmitted through mechanical connection 76 to vary the position of the slider on potentiometer 74 to cause a corresponding change in the output of oscillator 30. In this manner, the frequency of the write pulses are coordinated with the speed of the stylus motor, and the relative darkness and lightness of the trace should vary only with the voltage of the input pulses applied to terminal 10 and should not also change with the speed of the stylus drive. It will be appreciated that a step voltage input to the oscillators 78 and 30 could be provided just as well as the continuous voltage shown.

While only a single embodiment has been shown and described herein, modifications will be apparent to those skilled in the art, and I do not desire to be limited other than by the scope of the appended claims.

I claim:

1. In a chart recorder of the type wherein electrical pulse signals are used to mark a chart of electrosensitive paper including a stylus, electric motor means responsive to variable input frequencies for moving said stylus relative to said paper, and input circuit means for supplying pulse signals varying with changes in a condition to be recorded, electrical writing circuit means for converting said pulse signals to writing signals and for coordinating said writing signals with said stylus-moving means comprising:

a switching transistor;

an oscillator including a pulse transformer connected to said transistor, a second transistor connected to said transformer, and a frequency-determining circuit connected to said transformer and to said second transistor for controlling the period of conduction and the intervals between periods of conduction of said switching transistor;

amplifier means for amplifying the output of said switching transistor;

means for coupling the output of said amplifier means to said stylus;

circuit means having a variable frequency output connected to said electric motor means; and circuit means having a variable voltage output connected to said variable frequency circuit means and to said frequency-determining circuit such that when changes are made in the speed of said stylus drive corresponding changes are made in the frequency of said writing signals.

2. In a chart recorder of the type wherein electrical pulse signals are used to mark a chart of electrosensitive paper including a stylus for carrying a marking signal to said paper, frequency-responsive drive means for moving said stylus relative to said paper, and input circuit means for supplying pulse signals varying with changes in a condition to be recorded, electrical writing circuit means for converting said pulse signals to writing signals and for coordinating said writing signals with said stylus drive means comprising:
- switching means capable of switching current on and off at high frequency and means connecting said input pulse signal thereto,
- an oscillator connected to said switching means for controlling the period of conduction and the intervals between periods of conduction of said switching means,
- means for amplifying the output of said switching means,
- means for coupling the output of said amplifying means to said stylus,
- circuit means having a variable frequency output connected to said stylus drive means, and
- circuit means having a variable voltage output connected to said variable frequency circuit means and to said oscillator such that when changes are made in the speed of said stylus drive corresponding changes are made in the frequency of said writing signals.

3. In a chart recorder of the type wherein electrical pulse signals are used to mark a chart of electrosensitive paper including a stylus and means for moving said stylus relative to said paper, electrical writing circuit means for converting input pulse signals of varying voltage level to writing pulse signals comprising:
- a switching transistor;
- an oscillator including frequency-determining means connected to said transistor for causing said transistor to conduct current for a predetermined short time period;
- amplifier means for amplifying the output of said transistor;
- and transformer means for coupling the output of said amplifier means to said stylus,
- said stylus moving means including an electric motor whose speed is responsive to the frequency of its input current, circuit means having a variable frequency output connected to said electric motor, and crcuit means having a variable voltage output connected to said variable frequency circuit means and to said frequency-determining means such that when changes are made in the speed of said stylus moving means corresponding changes are made in the frequency of said writing pulse signals.

4. In a chart recorder of the type wherein electrical pulse signals are used to mark a chart of electrosensitive paper including a stylus and means for moving said stylus relative to said paper, electrical writing circuit means for converting pulse input signals of varying voltage level into writing signals comprising:
- switching means capable of switching current on and off at high frequency, and means connecting said input pulse signals thereto to convert each of said input pulse signals into a train of pulses of very short duration,
- a variable frequency output means including frequency-determining means connected to said switching means for periodically enabling said switching means to control the period of conduction and the intervals between periods of conduction of said switching means,
- means for amplifying the output of said switching means, and
- means for coupling said amplifying means to said stylus,
- said stylus moving means including an electric motor whose speed is responsive to the frequency of its input current, circuit means connecting said variable frequency output means to said electric motor, and circuit means having a variable voltage output connected to said frequency-determining means such that when changes are made in the speed of said stylus moving means corresponding changes are made in the frequency of said writing signals.

References Cited

UNITED STATES PATENTS

| 2,443,647 | 6/1948 | Waterman | 346—74 |
| 3,175,161 | 3/1965 | Hackborn | 346—74 |
| 3,188,645 | 6/1965 | Trumpy | 346—139 |
| 3,166,753 | 1/1965 | Ryerson | 346—74 |

BERNARD KONICK, *Primary Examiner.*

LEE J. SCHROEDER, *Assistant Examiner.*

U.S. Cl. X.R.

346—139